April 6, 1937. W. H. CURTISS 2,075,792
MEANS FOR SEPARATING ELEMENTS FROM SHAFTS
Filed April 9, 1935 2 Sheets-Sheet 1
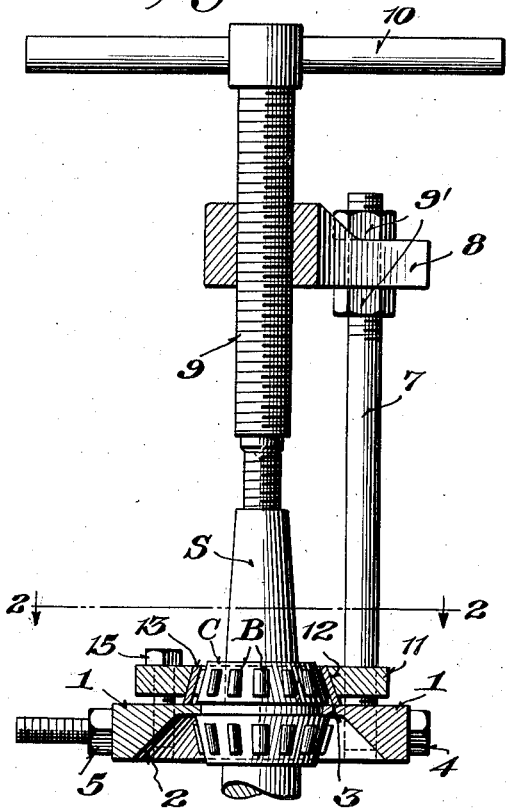
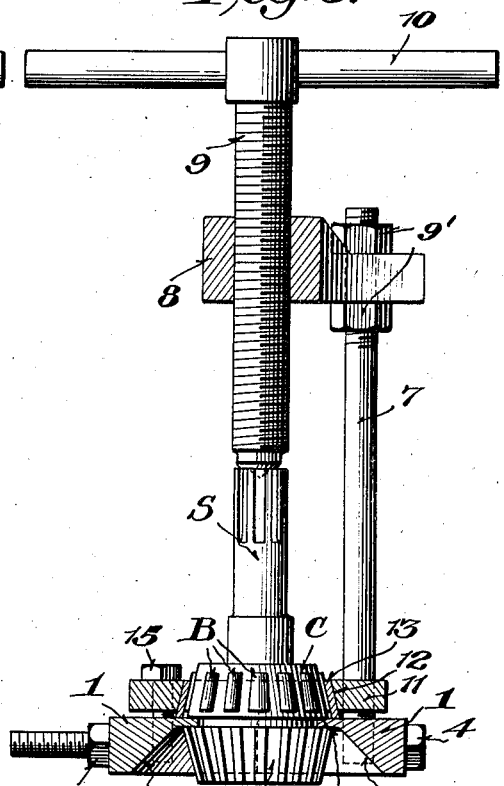
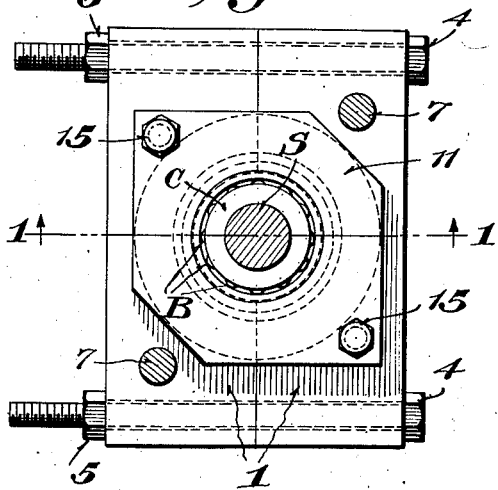
Inventor
William H. Curtiss,
By
Attorney

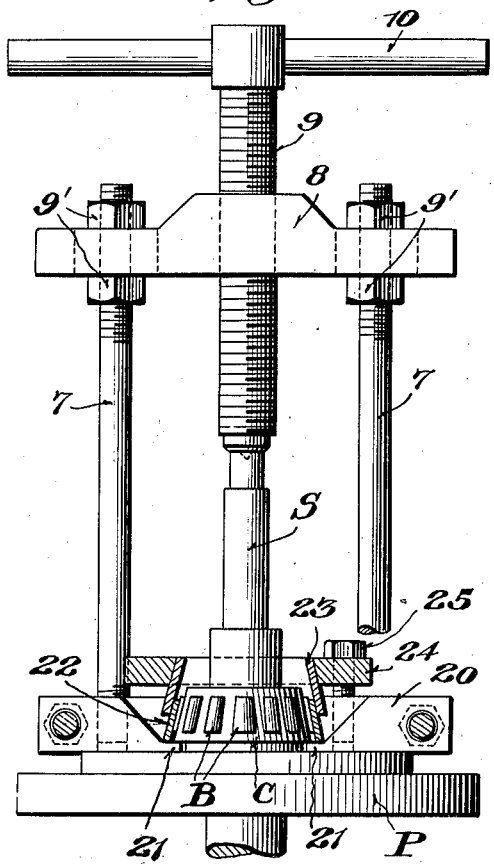
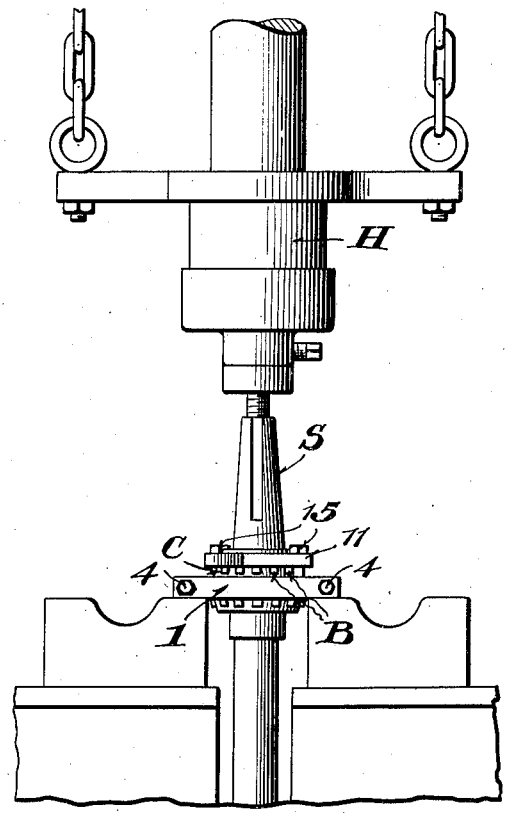
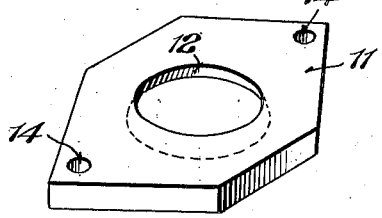

Patented Apr. 6, 1937

2,075,792

UNITED STATES PATENT OFFICE 2,075,792

MEANS FOR SEPARATING ELEMENTS FROM SHAFTS

William H. Curtiss, East Orange, N. J.

Application April 9, 1935, Serial No. 15,466

6 Claims. (Cl. 29—85)

This invention relates to means for separating elements from shafts and more particularly to pullers employed to remove non-friction bearings, such as ball or roller, from shafts and the like.

The invention primarily aims to utilize the space which exists between elements, such as two cages borne by a shaft, or in some instances one cage and an element, the latter lying adjacent to the last named cage, so that no further separation of the said parts is required in use of the invention.

The primary object of the invention is to provide a device of this character which is extremely simple and economical in production, as well as effective in operation.

A further object of this invention is to provide a device of this character in which there are a minimum of parts compactly related and which can be easily and quickly assembled.

A still further object of this invention is to provide a puller which can be applied to the device to be separated from the shaft without the use of a drift, or chisel, or other means likely to injure the device being pulled or other parts which may be mounted on the shaft, for example, a pinion.

A still further object of the invention is to provide a device of this type which can be easily and quickly adapted to roller bearings or other devices with which the invention is susceptible of use.

The invention has still further and other objects which will later be set forth and manifested in the following description.

Fig. 1 is a vertical sectional view taken on line 1—1 of Fig. 2,

Fig. 2 is a section taken on line 2—2 of Fig. 1,

Fig. 3 is a view similar to Fig. 1 showing the device used in connection with the removal of a bearing from a shaft, the latter equipped with a pinion, Fig. 4 is a bottom plan view of the puller plate, partly broken away, Fig. 5 is a vertical sectional view partly broken away showing the device used in connection with the removal of a roller bearing from a shaft having a pulley collar, or crown gear thereon, Fig. 6 is a side elevation showing the device used in connection with a power press, and Fig. 7 is a perspective view of the locking plate.

In proceeding in accordance with the present invention a puller plate or member is provided, which as clearly depicted in Fig. 4, is formed in two substantially similar sections 1, 1, the centers of which are formed with a complementary opening of predetermined size, that is, preferably counterbored as shown at 2 and terminates in a substantially flat lip or flange 3. The ends of the sections 1, 1 are formed with openings through which bolts 4 extend and which are equipped with nuts 5. It will be apparent that when the sections are in abutting engagement as depicted in Fig. 2 the lips 3, 3 will conjointly define a circular formation. Each of the sections 1, 1 are formed with transverse openings 6 to threadedly receive therein the outwardly extending posts or studs 7, which latter receive at their outer ends, a head 8 centrally perforated and threaded to receive the screw 9 that is provided with a handle 10 or the like for manual rotation of the screw. From Fig. 2 it will be seen that the posts or studs 7 are diagonally related so that the head is given a firm and substantial support from the puller plate. Nuts 9' are preferably employed in securing the head 8 to the studs 7 and engage opposite sides of the latter as clearly depicted in the drawings.

The locking plate 11 as shown in Fig. 7 is of solid or one-piece construction and is formed with a central opening 12, which latter is of conical or tapered formation so as to conform to the taper of the rollers in the usual cage C.

In instances where the diameter of the opening 12 of the locking plate is greater than that of the roller bearings, filler collars 13 may be employed and which are frictionally fitted in the opening of the locking plate 11. The locking plate, or the filler ring when employed, firmly hold the rollers in place.

The locking plate is further provided with a pair of diametrically opposed openings 14, which latter receive bolts 15 that are threaded into openings 16 provided therefor in the respective sections 1, 1 of the puller plate.

In operation, referring to Fig. 1, the sections 1, 1 are initially separated and the flanges or lips 3 thereof are engaged between the two roller bearings or cones shown, following which the bolts 4 are applied and the nuts tightened so as to dispose the puller plate in the position more clearly illustrated in Fig. 2. The locking plate is then positioned by threading same over the shaft S of the roller bearing so that the filler 13 which is placed in the conical or tapered opening 12 of the locking plate conformably engages the peripheries of the rollers B. At this point it will be understood, however, that the filler ring 13 while depicted in the drawings for purpose of illustration of its use, is not employed in event that the diameter of the opening 12 of the locking plate 11 is of a size to conformably engage the peripheries of the rollers B. The bolts 15 are then threaded through the openings 14 of the locking plate 11 and into the openings 16 of the puller plate and are turned so as to rigidly lock the plate 11 to the puller plate. Manual power is then applied to the screw 9 so as to disengage the shaft S from the roller bearings.

In Fig. 3, the operation is identical to that above described excepting that a gear G is depicted in association with the roller bearing device.

In Fig. 5 of the drawings the device is shown as employed in connection with the removal of a roller bearing from a pulley collar or crown gear such as disclosed at P. In this use of the invention, the puller plate 20, is inverted so that the flanges 21 thereof are disposed at the base of the roller or cone bearing B. In this form of the invention a conical collar 22 is placed over the rollers B and is engaged by a conical filler collar 23 which latter is disposed in the opening of the locking plate 24. The locking plate, it will be understood, is identical with the locking plate 11 shown in Fig. 7 and is locked to the puller plate by bolts 25 as in the instance of the bolts 15 in Figs. 1, 2, and 3.

In Fig. 6 instead of a manual control as shown at 9 and 10 in the remaining figures, a hydraulic press or the like indicated at H is employed to effect removal of the shaft, the same structure, i. e., of puller plate and locking plate being identical to that disclosed in Fig. 1, etc.

Although there is usually no space between the two cones or bearings on a shaft or one thereof and the element to which it lies adjacent, there is a considerable space between the two cages or one thereof and the element aforesaid. Therefore with the present invention this latter space is utilized to position the puller plate so that the pull goes through the cage to the rollers, enabling the bearing to be removed without any injury whatsoever thereto, or the shaft or other parts. From the foregoing it will be seen that the invention affords a means for easily and quickly separating the parts and without injury thereto.

What I claim is:

1. In a device of the type set forth, a puller member composed of sections having openings and having an inwardly extending flange to conjointly form a circular lip to engage in the space between the adjacent ends of cages of a pair of opposed bearings or other device or devices to be removed from a shaft, means to hold the sections in rigid engagement with one another, locking means acting as a unit and having an opening provided with a wall tapered to conformably engage peripheries of the rollers of a bearing or the like, means to rigidly connect the locking plate to the puller member, whereby said latter elements constitute a unit, and means independent of the locking plate and connected to the puller member to effect relative movement of the unit with respect to the shaft to effect separation of the device from the shaft by pressure exerted by the lip against the adjacent end of one of the cages.

2. In a device of the type set forth, a puller member composed of sections each having an opening provided with an inwardly extending flange to form a lip to engage in the space between adjacent ends of a pair of devices to be removed from a shaft, bolts extending through the sections to rigidly connect same, locking means acting as a unit having an opening provided with a wall shaped to conformably engage about the periphery of one of the devices to be removed, bolts for rigidly connecting the locking plate to the puller member, a pair of studs connected to the puller member and extending outwardly therefrom, a screw for engagement with the shaft to effect axial movement thereof thereby to cause the lip to exert pressure against the adjacent end of one of the devices, and means to support the screw from the studs.

3. In a device for removing elements from shafts having a space between the elements, a puller member, means whereby said member may be placed about the shaft, means carried by the member to engage in said space and against the adjacent end of one of the elements, locking means formed to engage about one of the elements, means to rigidly connect the locking means to the member, and means independent of the locking means and connected to the puller member to effect axial movement of the shaft, thereby to disengage said one element therefrom by pressure exerted against the said end of one of the elements.

4. In a device for removing elements from shafts having a space between the elements, a puller member, means whereby said member may be placed about the shaft, means carried by the member to engage in said space and against the adjacent end of one of the elements, locking means acting as a unit and having an opening formed to conformably engage about one of the elements, means to rigidly connect the locking means to the member, and means independent of the locking means and connected to the puller member to effect axial movement of the shaft to disengage said one element therefrom by pressure exerted against said end of said one element.

5. In a puller device of the type set forth, a puller member composed of sections formed to provide an opening having an inwardly extending lip to engage in the space between adjacent ends of a pair of devices to be removed from a shaft, means to rigidly connect the sections, locking means acting as a unit and having an opening provided with a wall shaped to conformably engage about the periphery of one of the devices to be removed, means for rigidly connecting the locking means to the puller member, a screw for engagement with the shaft to effect axial movement thereof thereby to cause the lip to exert pressure against the adjacent end of one of the devices, and means independent of the locking means and carried by the puller member to rotatably support the screw therefrom.

6. A puller device of the type set forth in claim 5, wherein the means carried by the puller member to support the screw therefrom includes a member spaced from the puller member and through which the screw is threaded, and members extending past the locking means to rigidly connect the last named member to the puller member.

WILLIAM H. CURTISS.